US008224746B1

(12) United States Patent
Rolf

(10) Patent No.: US 8,224,746 B1
(45) Date of Patent: Jul. 17, 2012

(54) METHOD FOR PROCESSING PAYMENT FOR A PURCHASE TRANSACTION

(75) Inventor: Devon A. Rolf, Paola, KS (US)

(73) Assignee: GoFigure Payments, LLC, Paola, KS (US)

( * ) Notice: Subject to any disclaimer, the term of this patent is extended or adjusted under 35 U.S.C. 154(b) by 30 days.

(21) Appl. No.: 12/973,361

(22) Filed: Dec. 20, 2010

Related U.S. Application Data

(63) Continuation of application No. 12/774,464, filed on May 5, 2010, now Pat. No. 7,856,387, which is a continuation of application No. 10/668,409, filed on Sep. 23, 2003, now Pat. No. 7,720,762.

(60) Provisional application No. 60/415,894, filed on Oct. 3, 2002.

(51) Int. Cl.
G06Q 40/00 (2012.01)

(52) U.S. Cl. .......................... 705/38; 705/40

(58) Field of Classification Search ............... 705/38, 705/40
See application file for complete search history.

(56) References Cited

U.S. PATENT DOCUMENTS

| | | | |
|---|---|---|---|
| 5,559,895 A | 9/1996 | Lee et al. |
| 5,806,045 A | 9/1998 | Biorge et al. |
| 5,870,722 A | 2/1999 | Albert et al. |
| 5,987,429 A | 11/1999 | Martizen et al. |
| 5,992,738 A | 11/1999 | Matsumoto et al. |
| 6,038,552 A | 3/2000 | Fleischl et al. |
| 6,098,053 A | 8/2000 | Slater |
| 6,119,106 A | 9/2000 | Mersky et al. |
| 6,233,568 B1 | 5/2001 | Kara |
| 6,347,305 B1 | 2/2002 | Watkins |
| 6,829,588 B1 | 12/2004 | Stoutenburg et al. |
| 6,868,391 B1 | 3/2005 | Hultgren |
| 6,876,979 B2 | 4/2005 | Ling |
| 7,089,208 B1 | 8/2006 | Levchin et al. |
| 7,104,443 B1 | 9/2006 | Paul et al. |
| 7,120,608 B1 | 10/2006 | Gallagher et al. |
| 7,376,583 B1 | 5/2008 | Rolf |
| 7,483,856 B2 | 1/2009 | Likourezos et al. |
| 7,512,563 B2 | 3/2009 | Likourezos et al. |
| 7,567,937 B2 | 7/2009 | Likourezos et al. |
| 7,599,881 B2 | 10/2009 | Likourezos et al. |
| 7,610,244 B2 | 10/2009 | Likourezos et al. |
| 7,627,528 B2 | 12/2009 | Likourezos et al. |
| 2001/0016835 A1 | 8/2001 | Hansmann et al. |

(Continued)

OTHER PUBLICATIONS

Notice of Allowance dated Nov. 4, 2010, in U.S. Appl. No. 12/774,464; Applicant: Rolf, Devon A.

(Continued)

Primary Examiner — Thomas Dixon
Assistant Examiner — Benjamin S Fields
(74) Attorney, Agent, or Firm — Hovey Williams LLP

(57) ABSTRACT

A method for processing payment for a purchase transaction includes enabling the provision of a first payments account to an accountholder and enabling a second payments account of the accountholder to be associated with the first payments account. A limit on the number of times the first payment account can be used for making purchase transactions within a determined time period is established. During a purchase transaction being made by the accountholder using the first account, information indicative of the first account and the purchase transaction is received. It is determined whether the limit on the number of times the first account has been used by the accountholder within the determined time period has been reached. When the limit on the number of times the account can be used in the time period has been reached, the second account of the accountholder is used for the purchase transaction.

1 Claim, 4 Drawing Sheets

U.S. PATENT DOCUMENTS

| | | | |
|---|---|---|---|
| 2002/0016769 | A1 | 2/2002 | Barbara et al. |
| 2002/0152160 | A1 | 10/2002 | Allen-Rouman et al. |
| 2002/0152168 | A1 | 10/2002 | Neofytides et al. |
| 2003/0004868 | A1 | 1/2003 | Early et al. |
| 2003/0139999 | A1 | 7/2003 | Rowe |
| 2003/0144942 | A1 | 7/2003 | Sobek |
| 2004/0033797 | A1 | 2/2004 | Ravisto et al. |
| 2004/0039694 | A1 | 2/2004 | Dunn et al. |
| 2004/0111361 | A1 | 6/2004 | Griffiths et al. |
| 2004/0111370 | A1 | 6/2004 | Saylors et al. |
| 2004/0225545 | A1 | 11/2004 | Turner et al. |
| 2005/0033691 | A1 | 2/2005 | Whewell et al. |
| 2005/0037731 | A1 | 2/2005 | Whewell et al. |
| 2005/0044018 | A1 | 2/2005 | Whewell |
| 2005/0256802 | A1 | 11/2005 | Ammermann et al. |
| 2006/0212393 | A1 | 9/2006 | Lindsay Brown |
| 2006/0294025 | A1 | 12/2006 | Mengerink |
| 2007/0287413 | A1 | 12/2007 | Kleitsch et al. |

OTHER PUBLICATIONS

Preliminary Amendment and Interview Summary dated Aug. 25, 2010, in U.S. Appl. No. 12/774,464; Applicant: Rolf, Devon A.

Response to Office Action dated Jul. 29, 2010, in U.S. Appl. No. 12/774,464; Applicant: Rolf, Devon A.

Terminal Disclaimer dated Jul. 29, 2010, in U.S. Appl. No. 12/774,464; Applicant: Rolf, Devon A.

Non-Final Office Action dated Jul. 15, 2010, in U.S. Appl. No. 12/774,464; Applicant: Rolf, Devon A.

Notice of Abandonment dated May 12, 2010, in U.S. Appl. No. 12/766,363; Applicant: Rolf, Devon A.

Notice of Allowance dated Mar. 12, 2010, in U.S. Appl. No. 10/668,409; Applicant: Rolf, Devon A.

Amendment and Interview Summary dated Mar. 2, 2010, in U.S. Appl. No. 10/668,409; Applicant: Rolf, Devon A.

Examiner Interview Summary dated Feb. 22, 2010, in U.S. Appl. No. 10/668,409; Applicant: Rolf, Devon A.

Final Office Action dated Dec. 22, 2009, in U.S. Appl. No. 10/668,409; Applicant: Rolf, Devon A.

Amendment and Interview Summary dated Sep. 8, 2009, in U.S. Appl. No. 10/668,409; Applicant: Rolf, Devon A.

Examiner Interview Summary dated Aug. 21, 2009, in U.S. Appl. No. 10/668,409; Applicant: Rolf, Devon A.

Non-Final Office Action dated Aug. 11, 2009, in U.S. Appl. No. 10/668,409; Applicant: Rolf, Devon A.

Amendment dated May 4, 2009, in U.S. Appl. No. 10/668,409; Applicant: Rolf, Devon A.

Non-Final Office Action dated Jan. 2, 2009, in U.S. Appl. No. 10/668,409; Applicant: Rolf, Devon A.

Amendment dated Aug. 8, 2008, in U.S. Appl. No. 10/668,409; Applicant: Rolf, Devon A.

Non-Final Office Action dated Feb. 5, 2008, in U.S. Appl. No. 10/668,409; Applicant: Rolf, Devon A.

"Sprint and eONE Global Announce Plans to Create First Interrooproperable Mobile Payments Network". eONE Global. May 22, 2002 <http://www2.pmewswire.com/cgl-bin/stories.pl?ACCT+104&STORY=/www/story/05-22-...>.

Toward The Single Account; United States Banker. Company/Corporate Profiel/Review; Dec. 16, 1974, pp. 5-6.

METHOD FOR PROCESSING PAYMENT FOR A PURCHASE TRANSACTION

RELATED APPLICATIONS

This application is a continuation, and claims priority benefit with regard to all common subject matter, of earlier-filed U.S. patent application Ser. No. 12/774,464, filed May 5, 2010, now U.S. Pat. No. 7,856,387, issued Dec. 21, 2010, and entitled "METHOD FOR FACILITATING A PURCHASE TRANSACTION USING AN ACCOUNT ASSOCIATED WITH A MEDIA ACCOUNT" (the '387 Patent). The '387 Patent is a continuation, claiming priority benefit with regard to all common subject matter, of earlier-filed U.S. patent application Ser. No. 10/668,409, filed Sep. 23, 2003, now U.S. Pat. No. 7,720,762, issued May 18, 2010, and entitled "SYSTEM AND METHOD FOR ELECTRONICALLY PROCESSING COMMERCIAL TRANSACTIONS BASED UPON THRESHOLD AMOUNT" (the '762 Patent). The '762 Patent is a non-provisional, claiming priority benefit with all regard to all common subject matter, of earlier-filed U.S. Provisional Patent Application No. 60/415,894, filed Oct. 3, 2002. The identified earlier-filed patents and provisional application are hereby incorporated by reference in their entirety into the present application.

BACKGROUND OF THE INVENTION

The present invention is directed to a system and method for electronically processing commercial transactions based upon threshold amount.

Electronic commerce systems, such as that described in my co-pending U.S. application Ser. No. 09/635,935, now U.S. Pat. No. 7,376,583, entitled "Device, System and Method for Making Transactions Via a Communications Link", which is hereby incorporated by reference, have been proposed. Such a system permits the user of a mobile phone, personal computing device (such as a PDA), a personal computer, telephone, interactive television, or interactive radio to make commercial transactions, such as the buying of goods or services, using the device. As described, a transaction may be settled electronically using a debit or credit account of the user. As further described, the account used to settle the transaction may be the service account corresponding to the communications service associated with the device, or may be another account, such as, for example, a VISA or Master Card account.

Communications commerce systems such as that described would offer providers of communications, media, or content services the ability to provide additional financial services such as transaction processing, settlement, and guarantee services. Additionally, use of such systems, once developed, will provide the service providers with increased opportunities to build and maintain customer relationships.

Of course, expansion of the services offered by a communications, media, or content service organization to include commerce services which permit a user to settle a commercial transaction with the communications, content, or media account, will increase the volume of work the provider must perform. Additionally, should the provider further provide guarantee services, alone or more likely with relationships with other organizations, the provider's financial exposure is increased.

Accordingly, the need exists for a method, system and business model which offers a communications, content or media service provider the ability to provide expanded financial transaction processing services to its customers, while controlling work load and exposure to financial risk. The present invention meets these and other needs.

SUMMARY OF THE INVENTION

The present invention is a system, method and business model for electronically processing commercial transactions. In particular, the present invention is useful in mobile commerce and telecommerce environments.

The components of the present invention include an input device through which a user initiates a commercial transaction. The input device may be any type of input device, including a telephone, personal computing device, wireless communications device, interactive television, interactive radio, etc. Additionally, the input device may be a conventional card reader or a biometric device.

The input device communicates through a communications system with a processor and, particularly, a server. As will be appreciated, the input device may communicate via a point of sale terminal to the central processor. The processor performs tasks of user authentication and fraud control, and retrieves account information associated with the user, and account information associated with a merchant at which the user is making a transaction. In short, the central processor performs the functions of authenticating the parties to the transaction and settling the transaction. Additionally, the central processor may process the data associated with the settlement in such a manner that billing outputs may be provided to the user and/or merchant, or that information may be transmitted to an additional processor or party for fulfillment of the output solutions and customer care.

The components of such a system will be readily understood from U.S. patent application Ser. No. 09/635,935, which has been incorporated herein by reference.

In the first embodiment of the present invention, a user of a communications service, a media service, or a content service, has first and second financial accounts associated with the service. For example, the communications service may be a mobile wireless, fixed wireless, satellite, or non-wireless telecommunications service. Media service may be a cable service, satellite radio service, or other media service. A content service may be a content aggregator or web-portal service, such as made popular by America On Line and others.

In accordance with the present invention, the first financial account is an account that is, or is associated with, the account associated with the service. The second account is a financial account that is not associated with the service, but may still be provided by the service provider. In accordance with the principles of the present invention, when a user of a communications service initiates a communication for the purpose of making a commercial transaction, the central processor performs the functions of authorizing the user and the merchant with which the user intends to conduct a transaction, and retrieves account information associated with the user and the merchant. The central processor determines a monetary amount associated with the transaction and then determines whether that amount meets or is greater than a selected threshold amount. When the amount does not meet, or is not greater than (depending upon the construct of the invention), the selected threshold amount, the central processor settles the transaction using the first account of the user and an account of the merchant. When, however, the amount associated with the transaction to be deducted does meet or is greater than the selected threshold amount, the central processor settles the transaction of the second account of the user.

Accordingly, in accordance with the present invention, the service provider can establish a threshold amount per transaction which defines the monetary magnitude of a transaction the provider is willing to settle. As will be appreciated, this amount may also be associated with an amount that the service provider is willing to guarantee, alone or in conjunction with other parties. When, however, the amount associated with the transaction is greater than the threshold, the burden of settling that transaction and/or guaranteeing it is passed to another party or other parties associated with the second account of the user.

For example, the present invention permits a service provider to permit transactions up to a selected amount to be billed directly to an account associated with the service, whereas any transaction over that amount is settled utilizing an account that is not associated with the service provider or is not directly associated with the service.

In a second embodiment of the present invention, which is very similar to the first embodiment, when the central processor retrieves account information associated with the user, the processor also retrieves the sum of transactions made within a particular period of time (such as a billing cycle) and, preferably, the sum of transactions made within the particular time period that have not been paid. In this embodiment, after all authorizations have been obtained, the processor determines whether the sum of those transactions made previously within the period and the monetary amount associated with the present transaction to be processed meet or are greater than a selected threshold amount. The processing then proceeds as described above, such that when the sum of the transactions does not meet or is not greater than a selected threshold amount, the processor settles a transaction using a first account of a user, that being the account associated with the service provider. When, however, the sum of those transactions within the period do meet or are greater than a selected threshold, the processor settles a transaction using a second account of the user, where that account is not associated with the corresponding service.

Accordingly, this embodiment of the invention permits a service provider to control the monetary amounts to be associated with the account within a period, and is not as concerned with the individual amount of the transaction.

As will be understood and appreciated, features of the first and second embodiments can be combined. Additionally, it should be understood that a modification to the second embodiment includes looking at the number of transactions made within a particular period, alone or in conjunction with the dollar amounts associated with the transaction. Accordingly, in the simpliest form of modification, a service provider could elect to permit a certain number of transactions to be billed to its account, and when that number of transactions is exceeded within a particular time frame, such as a one month billing cycle, additional transactions would be settled using a second account of the user, where that account is not associated with the service provider.

In still another embodiment of the present invention, the invention operates very similarly to the second embodiment described above, although retrieves an account balance associated with the user when making a determination of how to settle the present transaction. Accordingly, if an outstanding balance of the user does not meet or is not greater than a selected threshold, the balance associated with the account is not limited to a particular time frame. As in the previous embodiment, in such an instance, the processor settles the transaction using the first account of the user, that being the account associated with the corresponding service. When, however, the outstanding balance of the user is greater than a selected threshold, the processor proceeds to settle the transaction using a second account of the user. In accordance with this embodiment of the invention, the outstanding balance may include only those monetary amounts associated with transactions made by the user using the account, plus interest (if any), or may also include an outstanding balance associated with the service itself. Thus, for example, when the service involved is a wireless communications account, and the user is using his or her wireless telephone to make commercial transactions, the processor could look only at the balance associated with cumulative transactions made with the account or, alternatively, could also take into account charges owed for use of the wireless communications device for phone calls or Internet access, according to the particular service plan of the use.

It should be understood and appreciated that the present invention will employ additional tools for determining when the user cannot settle transactions using the second account, such as when the balance of that account is exceeded, or the user has failed to pay within a defined time period, etc. In such an instance, settlement of the transaction would not proceed, and an indication can be provided to the merchant, the point of sale terminal, and/or the communications device that processing could not continue.

DETAILED DESCRIPTION OF THE INVENTION

Figure 1:
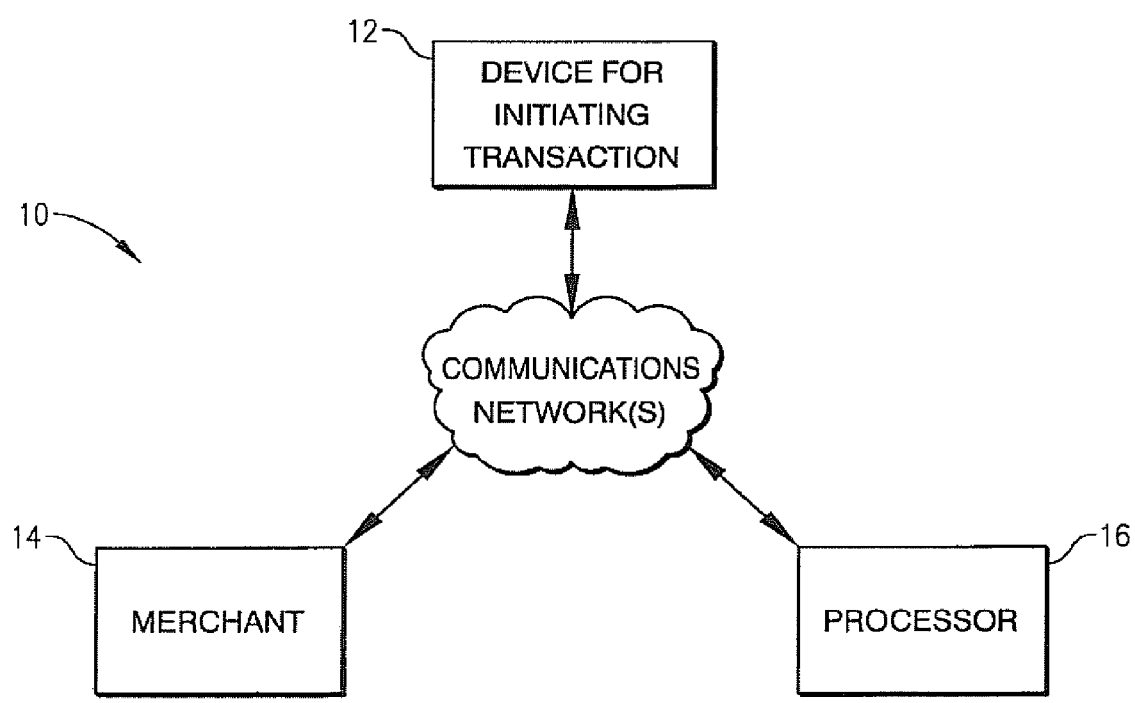
FIG. 1 is a block diagram of a system of the present invention.

With reference initially to FIG. 1, a system for conducting electronic transactions is denoted generally by the reference number 10, and is illustrated and described. System 10 has a communications device 12, which is employed by a user for initiating transactions. Communications device 12 may be any type of electronic communications device, including but not limited to, a wireless telephone, a personal digital assistant (PDA) with wireless data communications capabilities, a portable computer (such as a laptop computer), a personal computer, a telephone, an interactive radio or interactive television, or a telematics device. It should be understood and appreciated that communications device 12 has an input and an output, and preferably includes at least one input and at least one output. Examples of inputs include, but are not limited to, biometric devices, microphones for receiving voice instructions, touch screen displays, keypads, etc. Examples of outputs include, but are not limited to, speakers for providing voice instructions and prompts, displays, etc. Alternatively, device 12 may represent a reader, such as a card reader or biometric reader, for receiving information pertaining to an account or account holder. In other words, the present invention is useful independently of the manner in which a transaction is initiated.

Additionally, system 10 includes a merchant terminal 14. A merchant terminal 14 is a terminal associated with a merchant in which a transaction is made, and may include a web site or a point of sale terminal. System 10 further includes a central processing station 16 at which electronic transactions made between device 12 and merchant terminal 14 are processed. In particular, central processing station 16 performs a variety of transactions, such as user and merchant authorization, retrieval of information associated with the merchant and user, processing of the transaction, including settlement, and storage or transmittal of information for purposes of financial guarantee of the transaction, record maintenance, and provision of billing statements. A communications network, or networks, denoted generally by the reference numeral 14, is/are utilized for connection of the components of the system. It should be understood that the communications network may include wireless communications or fixed line/fiber optic/cable communications networks, and may genera)}y include Local Area Networks (LANS), Wide Area Networks (WANS), or a combination thereof.

Accordingly, system 10 is shown schematically for the purpose of representing any electronic communication system via which a user may initiate and make a purchase of goods or services with a merchant, regardless of whether the user is located at the locality of the merchant or remotely therefrom.

Operation of system 10 will be generally understood with reference to U.S. patent application Ser. No. 09/635,935, which is incorporated herein by reference. In particular, the user of device 12 initiates an application to conduct a commercial transaction with merchant 14, and a central processing station 16 authorizes and settles that transaction.

Figure 2:
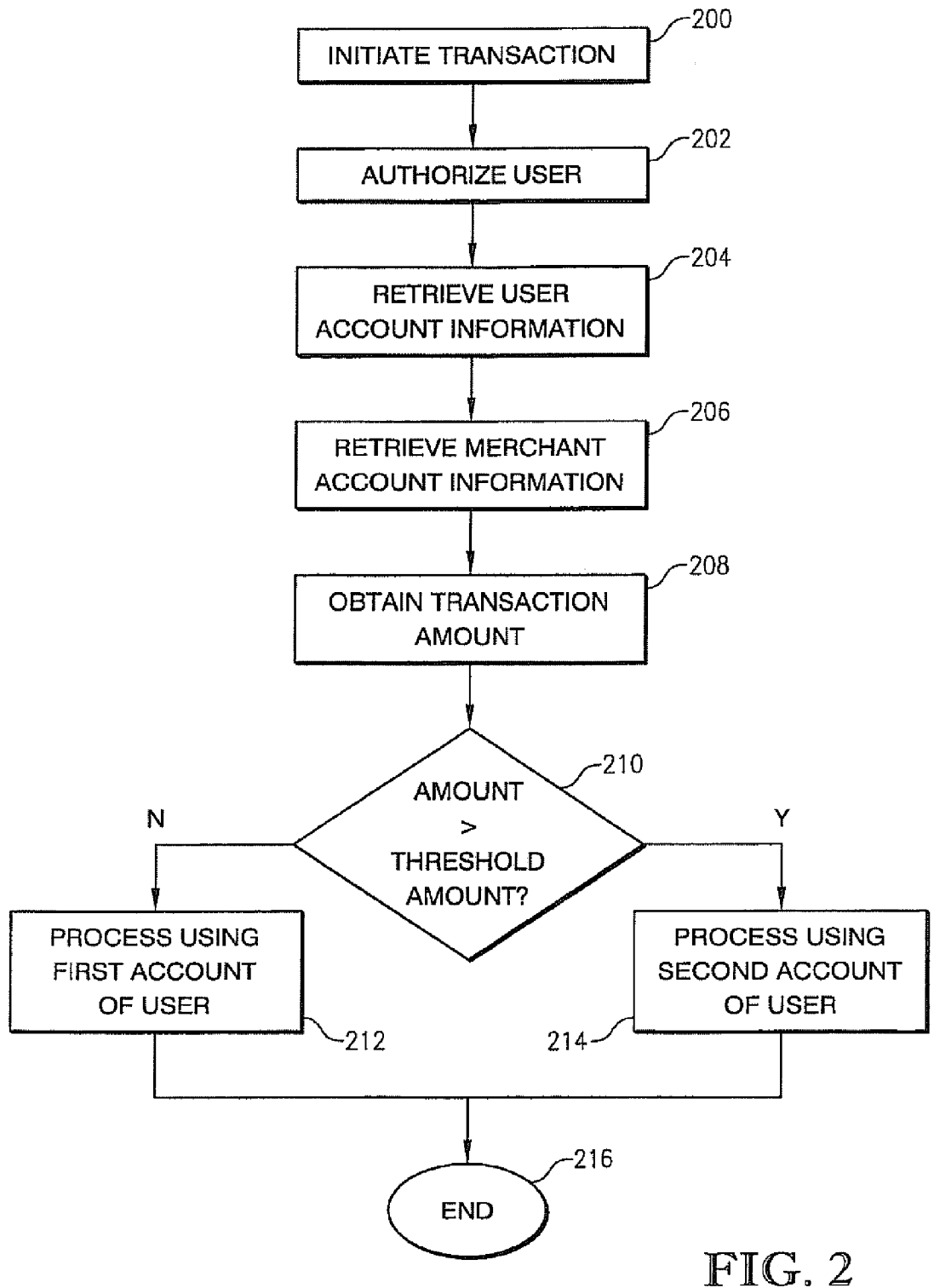
FIGS. 2-4 are flow charts illustrating the various embodiments of the present invention.

With reference now to FIG. 2, a preferred operation of system 10 and, particularly, a preferred method associated with system 10 of the present invention is illustrated and described. It should be understood that the flow-chart illustrates a preferred embodiment, but that certain steps may be formed in a different order or sequence or may be divided into separate steps. For example, when initially retrieving a user's account information, the system may retrieve information pertaining to only one account of the user, with information pertaining to a second account being retrieved as needed. Alternatively, initial retrieval of user account information may involve retrieving account information about a plurality of accounts.

In accordance with the invention, a user or account holder has a first account associated with communications services (e.g., a wireless voice/data service) and a second account associated with a bank account or credit account. At step 200, a software application utilized to make a transaction with the merchant associated with terminal 14 is initiated. It will be understood that initiation of this application may be accomplished by user input on device 12, by merchant input on terminal 14 when device 12 is associated with terminal 14, or automatically upon initiation of the transaction. Upon initiation of the application in step 202, communication is made via communication network 14 to central processing station 16, at which the processor at central processing station 16 receives data from device 12 and merchant 14 and makes a determination of whether each is authorized. Customer/merchant authorization is known in the credit/debit card payment industry, and similar techniques may be employed here.

At steps 204, 206, central processing station 16 retrieves information stored in memory and associated with the user and his or her accounts and the merchant and its account. At step 208, central processing station 16 obtains information, preferably from merchant terminal 14 of a monetary amount associated with a transaction to be conducted between the user of device 12 and the merchant associated with merchant terminal 14.

In accordance with the principles of the present invention, at step 210, central processing station 16 makes an electronic determination whether the monetary amount associated with the transaction has reached a selected threshold amount. As will be understood and appreciated, the actual calculation to be made at this step 210 may be a step to determine the monetary amount is less than, is less than or equal to, is greater than or equal to, or greater than a threshold amount. For purposes of clarity and simplicity, this application will set forth a preferred embodiment in which the central processing unit makes a determination whether the monetary amount associated with the transaction is greater than a threshold amount, but it will be appreciated that other determinations could be made.

When it is determined at step 210 that the monetary amount associated with a transaction is not greater than the selected threshold amount, processing advances to step 212 and the processor makes an accounting and settles the financial transaction using the account of the merchant and a first selected account of the user.

When, however, it is determined that at step 210 that the monetary amount associated with the transaction is greater than the selected threshold, processing advances to step 214 at which the processor processes the financial transaction using the account of the merchant and the second account of the user, where that second account is not associated with a service corresponding to device 12. Following the processing at step 212 or 214, processing advances to the end of this routine, indicated by reference numeral 216. It will be understood and appreciated that additional processing steps could be employed, in that data indicative of the transaction will be stored in memory associated with the utilized accounts, and the information may be transmitted to one or more other locations for the purpose of satisfying or accounting for financial guarantees for the transaction and/or for the purpose of providing information to be utilized in invoicing. It will also be understood and appreciated that a data base associated with central processor 16 at the same location may be utilized for such purposes, and that any transmission of data to another location may occur upon completion of the routine set forth in FIG. 2, or subsequently at periodic intervals by way of mass data transmission or batch file transmission.

In accordance with an aspect of the invention, the threshold amount utilized in the decision process at step 210 is data indicative of a monetary amount, stored in memory. Preferably, that threshold amount is established by the service provider associated with the first account. Accordingly, it should be understood that the threshold amount may be an amount that is identical for each of the service provider's customers, or at least those customers of the service provider which has established this feature on his or her account. Alternatively, the threshold amount may be unique to each user, such that a user with a greater income or better credit history, for example, may have a greater threshold amount than a user with less income or with less desirable credit history. Obviously, various criteria other than those listed here can be used to determine the particular threshold amount for each user. Accordingly, the present invention provides a service provider the ability to account for transactions directly to the account of a user, where that account is associated with the service provided by the service provider (such as a cable or satellite account, interactive radio account, communications telephone or wireless communications account, Internet access account, etc.) and, particularly, to make an accounting to that associated account for dollar amounts up to a threshold. It should, of course, be understood and appreciated that the invention can be employed such that only monetary amounts greater than a particular threshold be settled to the account, with lesser amounts being settled to the second account that is not associated with the service provider, although it is believed that the formerly described embodiment may be the most practical.

Additionally, in one embodiment, purchases accounted for on the user's account associated with the communications media portal service provider are invoiced to the user on a periodic basis, preferably with an invoice of the periodic charges associated with use of the communications, media or portal services. In this regard, payment may be required in full each month, or the account may operate as a revolving credit account and accumulate interest on unpaid balances. Alternatively, this account may be a deposit account into which the user may deposit funds from which debit transactions may be made in accordance with the principles of the invention, in which case the user would preferably receive a periodic statement of transactions. In such a case, charges associated with use of the communication media or portal service may be periodically applied against the balance in accordance with the principles of the present invention.

The second account may be a debit or a credit account and may be offered by the service provider or another institution. Understandably, any debit accounts may be set-up so as to accrue interest on funds in the account.

In a variation of the embodiment illustrated in FIG. 2, and as would apply to the other embodiments described herein, an additional processing step could be employed such that a plurality of ranges of monetary amounts are established. In such an embodiment, a different account may be associated with each range of amounts, such that a transaction falling within a particular range will be accounted utilizing the account corresponding to that range. In a preferred embodiment of this variation, three such ranges are established, whereby a range associated with the least and the greatest monetary amounts are accounted for using the second account, not associated with the service provider, while the account associated with the service provider is utilized for the middle range of transactions. In this way, very small micropayments or larger payments would be accounted for utilizing an account not associated with the service provider, while a selected middle range of transactions would utilized the account associated with the service provider. Other variations could be employed.

Figure 3:
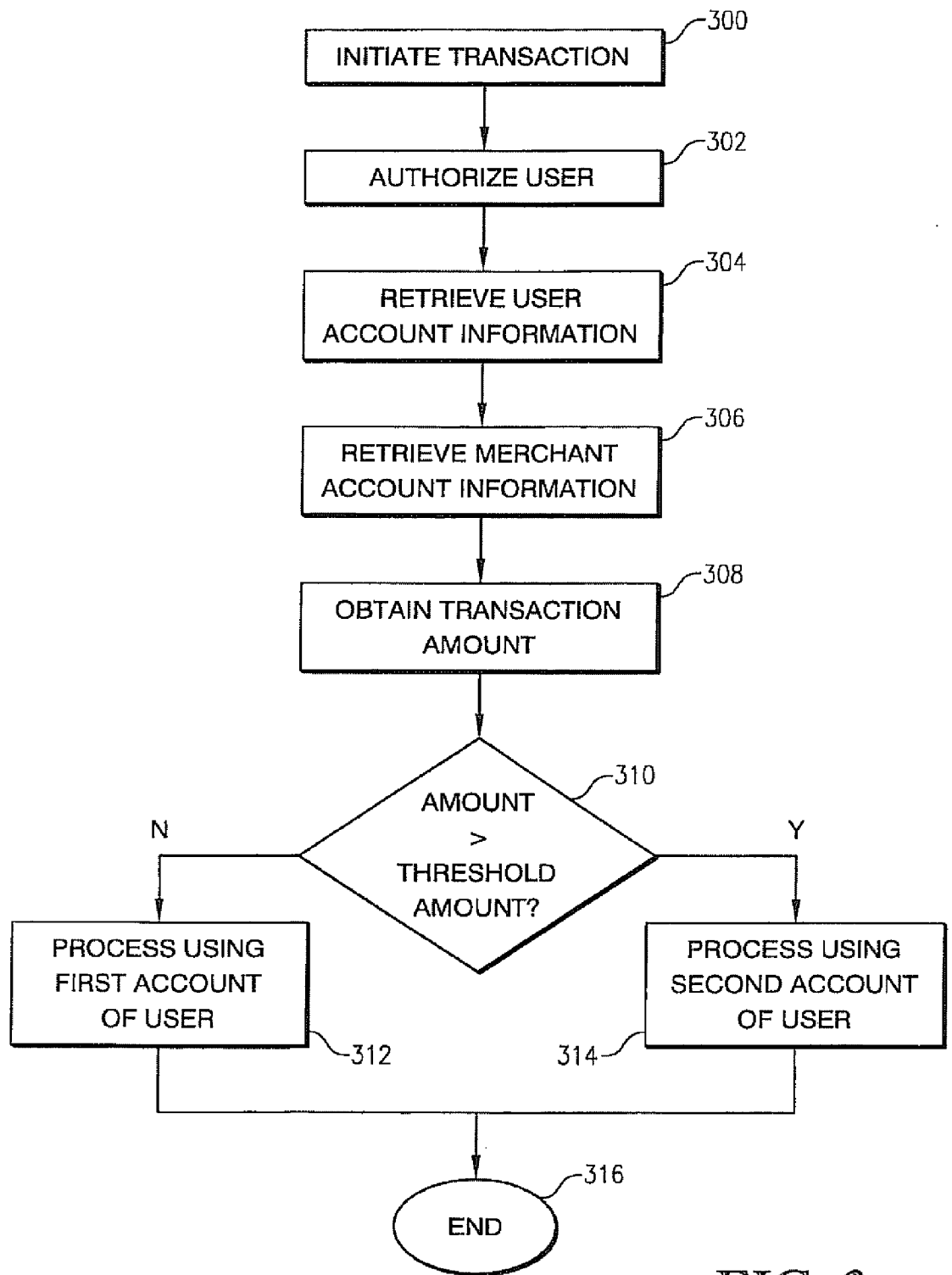

With reference now to FIG. 3, an alternate embodiment of the present invention and, particularly, of the method and operation of system 10 of the present invention is illustrated and described. The steps of the embodiment of FIG. 3 are very similar to those of FIG. 2, with the following exceptions. At step 304, when the central processing station 16 retrieves the account information of the user, the central processing station 16 also retrieves a monetary amount of charges that have accumulated within a selected time period, such as the most recent billing cycle (perhaps one month) of the service account with which device 12 is associated. It should be understood that the monetary amount retrieved may be the sum of all purchase transactions made utilizing device 12 for the given period, or may be that sum plus charges associated with conventional use of the device, such as Internet access or telephone usage.

In any event, at step 308, the monetary amount retrieved is added to the monetary amount of the transaction to be processed. Then, at step 310, the central processing station 16 makes a determination of whether that cumulative amount is greater than a selected threshold, and processing proceeds step 312 or 314, and then onto 316, depending upon the outcome of the decision making step at 310.

Accordingly, the embodiment of the invention illustrated in FIG. 3, unlike the embodiment of FIG. 2, which looks at the monetary amount associated with the specific transaction, rather looks at the cumulative monetary amount owed for a given billing cycle or other select periods.

Figure 4:
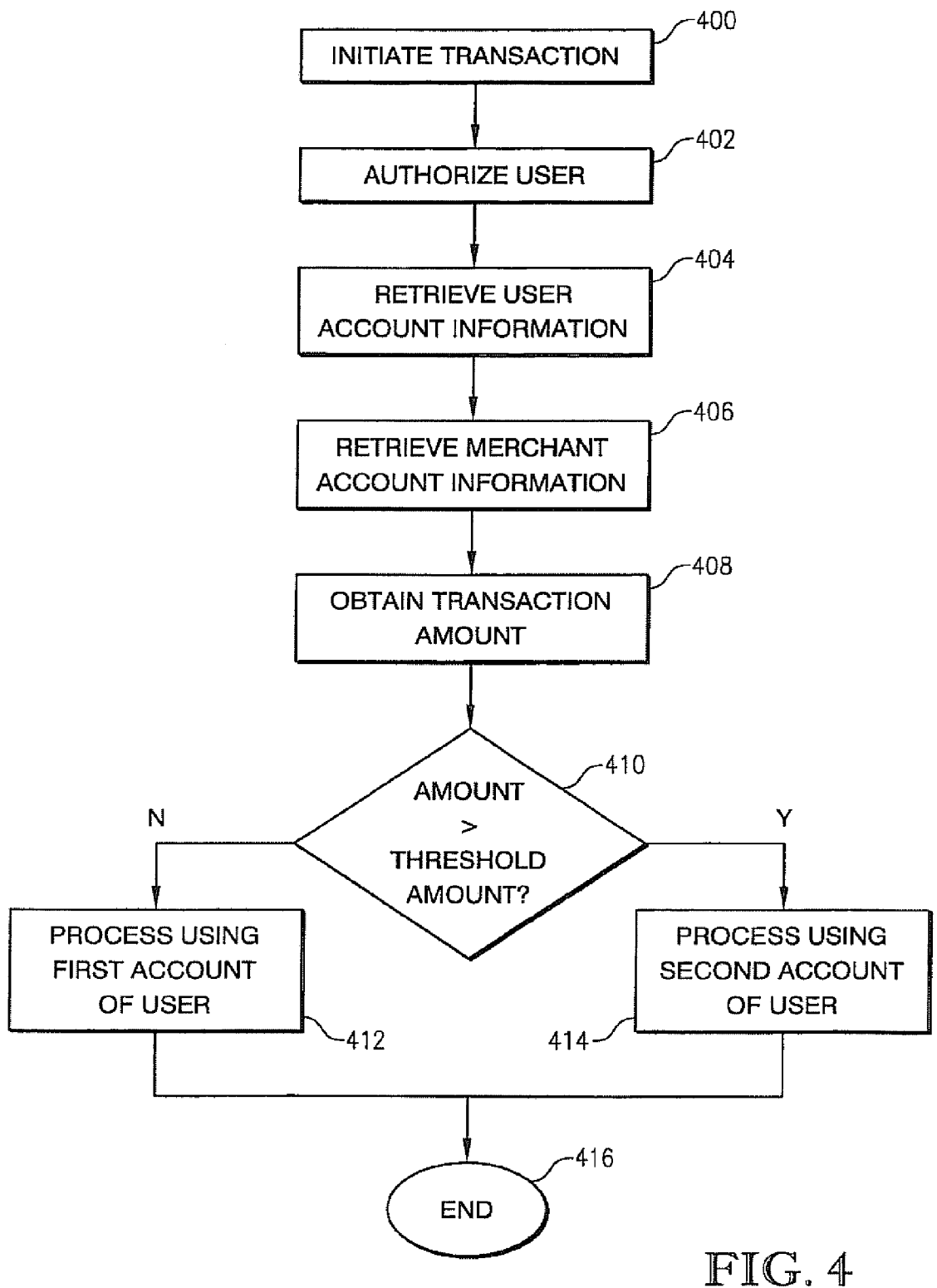

With reference now to FIG. 4, an additional embodiment of the invention is illustrated and described.

In particular, in the embodiment in FIG. 4, processing is substantially similar to that of the embodiments illustrated and described with respect to FIGS. 2 and 3, with the following notable exceptions. In this embodiment, at step 404, when central processing station 16 retrieves user account information, information about the user's balance in the account is retrieved. In this regard, unlike the embodiment of FIG. 3, illustrated and described with respect to FIG. 3, the embodiment of FIG. 4 is not concerned with a particular time period associated with the accumulated charges. Accordingly, data indicative of a monetary amount associated with transactions made with the first account associated with the service provider (including if desired any charges associated with the services other than transactions and interest, if any) are retrieved. In accordance with the preferred embodiment of this invention if the cumulative amount is greater than the threshold, as determined at step 410, then central processing station 16 will settle the transaction utilizing the second account which is not associated with the user. According to one preferred approach of accomplishing this determination, the retrieved cumulative monetary amount (i.e., the balance) associated with the first account is added to the monetary amount to be associated with the transaction to be made (as indicated at step 408), and that summed amount is compared with the selected threshold amounts at step 410, and then processing advances onto step 412 or 414, depending upon the outcome of the decision making step at 410.

From the foregoing, it will be seen that this invention is one well adapted to attain all the ends and objects hereinabove set forth, together with other advantages which are obvious and which are inherent to the invention.

It will be understood that certain features and subcombinations are of utility and may be employed without reference to other features and subcombinations. Additionally, it should be understood that features of the embodiments illustrated and described with reference to FIGS. 2-4 may be combined. This is contemplated by and is within the scope of the claims.

Since many possible embodiments may be made of the invention without departing from the scope thereof, it is understood that all matters herein set forth or shown in the accompanying drawings is to be interpreted as illustrative and not in a limiting sense.

The invention claimed is:

1. A computer-implemented method for processing payment for a purchase transaction, said method comprising:
enabling the provision of an account to an accountholder, wherein said account is a first payments account;
enabling a second account of the accountholder to be associated with the first payments account, wherein said second account is a second payments account of the accountholder;
establishing a limit on the number of times said first payment account can be used by the accountholder for making purchase transactions within a determined time period;
receiving information indicative of said first account and a purchase transaction being made by said accountholder, wherein said receiving information indicative of said first account is performed by at least one electronic processor;
determining, with at least one electronic processor, whether the number of times said first account has been used for making purchase transactions by the accountholder within said determined time period has reached said established limit on the number of times said first payment account can be used by the accountholder within the determined time period; and when said limit on the number of times said first payment account can be used by the accountholder for making purchase transactions within a determined time period has been reached within said time period, causing, with at least one electronic processor, said second account of the accountholder to be used for said purchase transaction for which said information is received.

* * * * *